United States Patent [19]

Grzesiak

[11] 4,198,062
[45] Apr. 15, 1980

[54] VALVE STEM SEAL

[75] Inventor: Anthony J. Grzesiak, Burnham, Ill.

[73] Assignee: Borg-Warner Corporation, Chicago, Ill.

[21] Appl. No.: 939,030

[22] Filed: Sep. 1, 1978

[51] Int. Cl.² .............................................. F16J 15/52
[52] U.S. Cl. ..................................... 277/3; 251/214; 123/188 P
[58] Field of Search ...................... 251/214; 277/3, 27, 277/30, 56, 67, 68, 97, 100, 134, 207 R, 212 R, 212 C, 213, 214, 215; 123/188 P, 188 GC

[56] References Cited

U.S. PATENT DOCUMENTS

| | | | |
|---|---|---|---|
| 2,850,305 | 9/1958 | Chadowski | 277/181 |
| 2,860,615 | 11/1958 | Mayer | 123/188 P |
| 2,906,255 | 9/1959 | Bunce | 123/188 P |
| 3,326,562 | 6/1967 | Deuring | 277/182 |
| 3,372,941 | 3/1968 | Liebig | 277/178 |
| 3,493,236 | 2/1970 | Kleindienst | 277/178 |
| 3,600,045 | 8/1968 | Inoue | 308/24 |
| 3,833,273 | 9/1974 | Rickley | 277/56 |
| 3,901,131 | 8/1975 | Prasse | 92/182 |
| 4,010,960 | 3/1977 | Martin | 277/134 |
| 4,078,722 | 3/1978 | Luckenbill | 251/214 |
| 4,114,059 | 9/1978 | Albaric | 277/3 |
| 4,124,220 | 11/1978 | Leone | 123/188 P |

Primary Examiner—Robert I. Smith
Attorney, Agent, or Firm—James A. Geppert

[57] ABSTRACT

A valve stem seal for an intake or exhaust valve in an internal combustion engine where the seal allows a metered amount of oil to run down the valve stem for lubrication of the stem in its valve guide. The seal is formed of a relatively rigid valve seal body having a cylindrical wall or skirt engaging the valve guide boss and an upper radially inwardly offset cylindrical wall of a smaller diameter with a radially inwardly extending flange having metering grooves on the upper and lower surfaces thereof, and a resilient insert or collar is positioned on the flange to sealingly engage the reciprocating valve stem; the motion of the collar during reciprocation of the valve stem providing a pumping action through the metering grooves.

17 Claims, 6 Drawing Figures

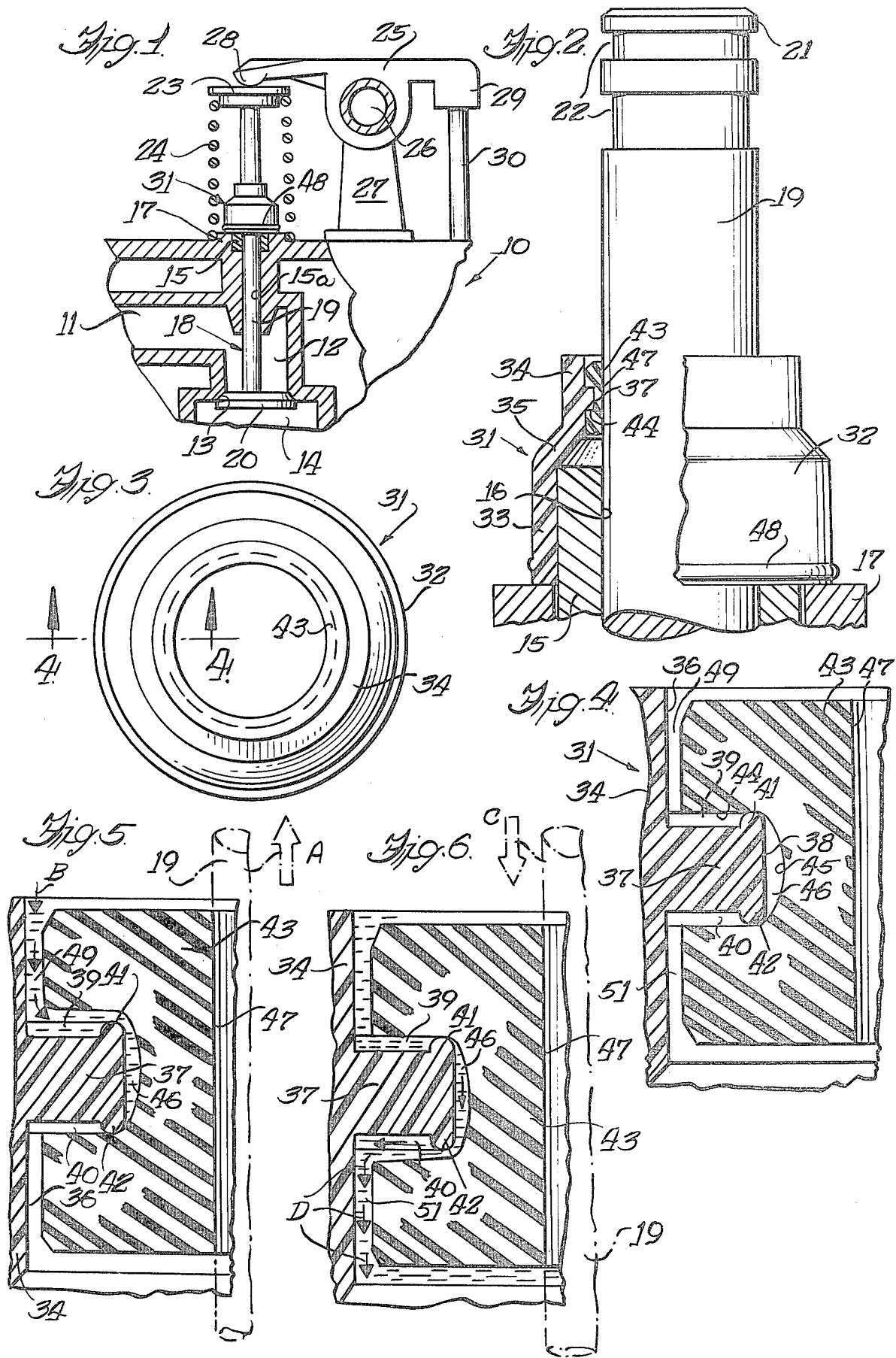

VALVE STEM SEAL

BACKGROUND AND SUMMARY OF THE INVENTION

The present invention provides an improved valve stem seal and more particularly to a valve stem seal having a pumping action for oil to lubricate the valve stem in its associated guide.

An internal combustion engine includes a plurality of intake and exhaust valves, each valve comprising a valve head received in a valve seat defining an intake or exhaust passage and an elongated stem reciprocably mounted in a valve guide formed in the cylinder head of the engine. The end of the valve stem remote from the head is engaged by a rocker arm in an overhead valve engine or by a cam-operated plunger in an L-head engine. Oil is generally supplied to the upper end of the stem through an oil splash system or by a localized oil supply through the rocker arm to the point of contact with the end of the valve stem so that lubrication is present between the valve stem and its associated guide.

Oil is also present in the upper cylinder area of overhead cam engines due to slow oil draindown at higher engine speeds and camshaft lubrication. This oil floods the upper valve seal area, making umbrella-type seals inefficient in overhead cam engines.

In order to reduce oil consumption and provide optimum engine performance, a seal has been provided for the valve stem ranging from the umbrella-type shield utilized to deflect the majority of oil away from the upper end of the valve guide to a seal closely conforming to and engaging the valve guide boss and valve stem to restrain all oil flow to the valve stem save a thin film acting as a lubricant for the stem in the guide. However, many of these metering-type seals were ineffective and either dried out during use so that no oil was metered or, because of wear, allowed an excess of oil to enter the valve guide. The present invention obviates these problems by providing a valve stem seal with a positive pumping action.

The present invention comprehends the provision of a valve stem seal formed of two parts; the part engaging the valve stem formed of an elastomeric material closely embracing the valve stem and tending to prevent capillary flow therebetween. The outer seal part is formed of a relatively inflexible material and is provided with a cylindrical wall or skirt encompassing the valve guide boss and a radially inwardly offset cylindrical wall at the upper end provided with a radially inwardly extending annular flange adapted to be received in an annular groove in the resilient valve seal part that engages the valve stem. The annular flange has metering grooves on the upper and lower surfaces thereof cooperating with the flexing of the insert or collar during reciprocation of the valve stem to positively pump oil there along.

The present invention also comprehends the provision of a two-part valve stem seal wherein the seal body supporting the collar is formed of a relatively inflexible plastic material having a lower cylindrical wall fitting over the valve stem guide. The plastic bodied seal is designed to lock on an engine valve guide boss without conventional external retention rings.

The present invention further comprehends the provision of a two-part seal having a valve seal body and a resilient insert or collar providing the valve stem engaging surface. The metering area for the seal is external to the valve stem/seal interference area, thus eliminating a possible inconsistency of action found in positive type seals currently available.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 1 is a fragmentary side elevational view, partially in cross section, of an overhead valve assembly provided with a valve stem seal of the present invention.

FIG. 2 is an enlarged partial vertical cross sectional view of the seal and valve guide boss with the valve stem shown in elevation.

FIG. 3 is a top plan view of the valve stem seal.

FIG. 4 is a partial vertical cross sectional view taken on the line 4—4 of FIG. 3.

FIG. 5 is an enlarged partial cross sectional view of the seal showing the action thereof upon upward movement of the valve stem.

FIG. 6 is similar to FIG. 5 but showing the action upon downward movement of the valve stem.

DESCRIPTION OF THE PREFERRED EMBODIMENT

Referring more particularly to the disclosure in the drawing wherein is shown an illustrative embodiment of the present invention, FIG. 1 discloses a portion of a cylinder head 10 for an internal combustion engine, such as utilized for an automotive vehicle, wherein the cylinder head has a passage 11 which may be either a part of the fuel intake system or part of the exhaust system. The passage 11 extends to an opening 12 bounded by a valve seat 13 into a combustion chamber 14. Secured to the cylinder head 10 is a valve guide boss 15 which may either be an integral part of the cylinder head or a separate member suitably secured within the cylinder head and axially aligned with a cylindrical passage 15a opening into the passage 11. Valve guide 16 is formed as the interior surface in the valve guide boss 15 and forms a continuation of passage 15a. An annular embossment 17 on the cylinder head 10 has a counterbore receiving the valve guide boss 15.

A valve 18 is provided in the cylinder head 10 with an elongated valve stem 19 received in the guide 16 in the valve guide boss 15 and an enlarged valve head 20 positioned below the opening 12 and sealingly engaging the valve seat 13 to open and close the communication between the passage 11 in the cylinder head and the combustion chamber 14 as the valve reciprocates. The valve stem 19 projects upwardly beyond the top of the valve guide boss 15 and is provided at its upper end 21 with grooves 22 for securing a collar or plate 23 thereto. A coil spring 24 encompasses the valve stem 19 and boss 15 with one end abutting the collar 23 and the opposite end encompassing the embossment 17 and abutting the cylinder head 10.

To operate the valve 18, a rocker arm 25 is shown pivotally mounted at 26 for rocking movement on a bracket 27 extending upward from the cylinder head 10, with one end 28 of the arm engaging the upper end 21 of the valve stem 19 and the other end 29 engaged by a push rod 30 which is suitably operated by engine-driven cam means (not shown).

To reduce wear at the point of rubbing contact between the end 28 of the rocker arm and the end 21 of the valve stem and to lubricate the valve guide 16, oil is conventionally supplied from an opening (not shown) in the rocker arm 25 to the end 21 of the valve stem, and the oil then runs downwardly along the stem to the valve guide. If there is excess clearance between the valve stem 19 and the guide 16, the oil will continue to move down the stem to the valve head 20. If the valve controls the intake to the combustion chamber 14, the oil will be drawn into the chamber and will be burned. Likewise, for an exhaust valve, the oil will be burned by the hot gases and, in either instance, cause smoke in the exhaust.

To prevent the leakage of oil to the combustion area, a valve seal 31 is provided on the valve stem 19 at the upper end of the boss 15. The seal is formed of two parts; the seal body 32 being formed of a suitable inflexible material, such as a suitable metal or Nylon, and has a generally inverted cup shape with a cylindrical portion or skirt 33 abutting the embossment 17 and closely encompassing the boss 15 and an upper cylindrical wall 34 jointed to the skirt 33 by an inwardly inclined offset portion 35. The interior surface 36 of the wall 34 is provided with an annular inwardly extending flange or rib 37 having an inner surface 38 defining an opening of a larger diameter than that of the valve stem. The upper and lower surfaces of the rib are provided with inwardly extending metering grooves 39 and 40; the grooves terminating short of the inner diameter of the rib in upper and lower rounded sealing lips 41 and 42, respectively.

An insert or collar 43 formed of a resilient material, such as rubber, provides the second part of the seal and has an outer annular groove 44 receiving the rib 37; the base 45 of the groove being concave so as to form an oil reservoir 46 between the inner surface 38 of the rib 37 and the concave surface 45 of the insert. The interior generally cylindrical surface 47 of the insert sealingly engages the external surface of the valve stem 19.

The formation of the seal body 32 of a relatively inflexible material allows the skirt 33 to frictionally engage and lock onto the valve guide boss 15 without the necessity of external retention rings. Adjacent the lower edge of the skirt 33, the wall may be formed with a slightly enlarged reinforcing rib 48 to enhance the rigidity of the plastic seal body and promote retention through local distortion upon installation.

This seal 31 is designed to take advantage of the movement of the resilient collar 43 induced in the positive valve stem seal by the friction occuring between the collar and the valve stem 19 during reciprocation of the stem. Considering FIG. 5, on a valve upstroke, as shown by arrow A, the insert 43 tries to follow the valve stem upward, so that oil that is present in the annular space 49 between the seal body and insert is allowed to move through the grooves 39 into the oil reservoir 46, as shown by arrows B, as the seal between the insert and the lip 41 is broken. During the valve stem upstroke, the lower lip 42 is in sealing engagement with the insert to prevent oil from leaving the reservoir 46.

Upon a valve downstroke as shown by the arrow C in FIG. 6, the insert tends to move downward with travel being limited. Movement of the insert causes the insert to sealingly engage the upper lip 41 to prevent backflow of oil and to move away from the lower lip 42. Also, movement of the insert causes compression of the oil reservoir 46 so as to positively force the oil around the lip 42 and through the grooves 40 to move downward through the annular space 51 between the seal body and the insert and beyond the seal to lubricate the valve stem as shown by the arrows D.

The present seal provides a positive pumping action of the oil between the seal body and insert to lubricate the valve stem and guide, with the amount of oil being metered in the pumping action controlled by the volume of the oil reservoir 46 between the flange or rib 37 and the resilient insert 43. Although shown in FIG. 1 with a push rod operated rocker arm, the valve stem seal can also be utilized in an overhead cam engine.

I claim:

1. A seal adapted to be mounted on the end of a cylindrical guide boss having a reciprocating rod therein, comprising a relatively inflexible seal body including an annular skirt portion adapted to encompass the guide boss and an upper generally cylindrical wall of a smaller diameter than said skirt portion and joined thereto by an inclined offset portion, an inwardly extending rib on the interior surface of said upper wall, and a resilient insert having an exterior surface spaced from the interior surface of said upper wall and an interior surface sealingly engaging said rod, said insert exterior wall having an annular groove receiving said rib.

2. A seal as set forth in claim 1, including means between said rib and said insert to pump lubricant therebetween and to meter the flow of the pumped lubricant.

3. A seal as set forth in claim 2, in which said pumping and metering means includes a plurality of upper and lower metering grooves on said rib, said rib terminating in a generally cylindrical surface forming upper and lower sealing lips for said metering grooves, and said annular groove in said insert having generally parallel upper and lower surfaces normally engaging said sealing lips and joined by a concave base surface, said concave surface and said inner cylindrical wall of said rib forming a lubricant reservoir.

4. A seal as set forth in claim 1, in which said inflexible seal body sealingly engages said guide boss without benefit of external retention rings.

5. A seal as set forth in claim 1, in which the exterior surface of said insert is spaced from the interior surface of the upper wall to provide an annular space therebetween.

6. A seal as set forth in claim 1, in which said rib has a plurality of inwardly extending metering grooves formed in the upper and lower surfaces thereof.

7. A seal as set forth in claim 1, in which said rib terminates in an inner cylindrical wall surface having an upper and a lower sealing lip formed at the upper and lower surfaces of said rib.

8. A seal as set forth in claim 7, in which said insert groove includes a concave base cooperating with said inner cylindrical rib wall surface to form an oil reservoir.

9. A seal as set forth in claim 1, in which said insert groove includes generally flat upper and lower surfaces joined by a concave base surface.

10. A seal as set forth in claim 9, in which said concave base surface acts in conjunction with said rib to form an oil reservoir.

11. A seal as set forth in claim 1, in which the exterior surface of said insert is spaced from the interior surface of said upper seal body wall to provide an annular space therebetween, said rib terminating in a generally cylindrical interior wall and having a plurality of metering grooves formed on the upper and lower surfaces thereof, an upper sealing lip and a lower sealing lip formed as an extension of the interior rib wall to cooperate with said insert to control fluid movement through said grooves, said insert groove having generally flat upper and lower surfaces normally engaging said lips and a concave base surface, said base surface in conjunction with said interior rib wall forming an oil reservoir separated from said grooves by said sealing lips.

12. A seal as set forth in claim 11, in which said insert is deformed upon reciprocatory movement of the rod resulting in a pumping action by said oil reservoir.

13. A seal as set forth in claim 12, in which upward movement of the rod causes the insert to try to follow the rod so that the lower sealing lip is in sealing contact with said insert and the sealing contact between the upper sealing lip and said insert is broken to allow oil flow through said upper metering grooves into the oil reservoir, and upon downward movement of the rod, the insert is downwardly deformed to engage the upper sealing lip and the sealing contact between the lower sealing lip and the insert is broken, movement of said insert causing compression of the oil reservoir to force oil past the lower sealing lip and through the lower metering grooves.

14. A valve stem seal assembly including a valve having a stem reciprocating in a valve guide, and a seal comprising a seal body having an annular skirt portion adapted to sealingly engage the upper end of a valve guide boss and a generally cylindrical wall at the upper end of the skirt and joined by an inclined radially inwardly offset wall portion, an inwardly extending annular rib on the interior surface of the upper wall and defining an opening receiving the valve stem, and a resilient insert having an interior cylindrical surface sealingly engaging the valve stem and an annular groove in the exterior surface receiving said rib therein, the exterior surface of said insert being spaced from the interior surface of said upper wall to form an annular space therebetween, said rib having metering grooves on the upper and lower surfaces thereof and terminating in a generally cylindrical surface forming upper and lower sealing lips for said grooves, and said insert groove having upper and lower surfaces normally engaging said lips and joined by a concave base surface, said concave surface cooperating with the inner surface of said rib to form an oil reservoir.

15. A valve stem seal assembly as set forth in claim 14, in which said insert deforms upon reciprocal movement of the valve stem to provide a pumping action by said sealing lips and reservoir.

16. A valve stem seal assembly as set forth in claim 15, in which upward movement of the valve stem acts to move said insert upwardly into sealing contact with said lower sealing lip and the sealing contact between the upper sealing lip and the insert is broken to allow oil flow through the upper metering grooves to the reservoir, and downward movement of the valve stem causes the insert to return to sealing engagement with said upper sealing lip and the sealing contact between the insert and the lower sealing lip is broken and the oil reservoir is compressed to force the oil in the reservoir past the lower sealing lip and through the lower metering grooves and annular space.

17. A valve stem seal assembly as set forth in claim 16, in which the pumping action of the reservoir and the flow through the metering grooves meters the quantity of oil released for lubrication of the valve stem and guide.

* * * * *